US007084571B2

(12) United States Patent
Ito et al.

(10) Patent No.: US 7,084,571 B2
(45) Date of Patent: Aug. 1, 2006

(54) VEHICULAR LAMP

(75) Inventors: Masayasu Ito, Shizuoka (JP); Kentarou Murakami, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/108,702

(22) Filed: Apr. 19, 2005

(65) Prior Publication Data

US 2005/0236999 A1 Oct. 27, 2005

(30) Foreign Application Priority Data

Apr. 21, 2004 (JP) ............................ 2004-125972

(51) Int. Cl.
*B60Q 1/02* (2006.01)

(52) U.S. Cl. ........................ 315/82; 307/10.8; 315/276

(58) Field of Classification Search ................ 315/291, 315/224, 312, 209 R, 77–82, 307, 185 S, 315/185 R, 276, 282, 244; 307/9.1, 10.1, 307/10.8

See application file for complete search history.

(56) References Cited

U.S. PATENT DOCUMENTS 5,568,018 A * 10/1996 Muzic ........................ 315/276
6,340,868 B1 * 1/2002 Lys et al. ................ 315/185 S
6,867,557 B1 * 3/2005 Ito et al. ..................... 315/307
2005/0269968 A1 * 12/2005 Ito et al. ..................... 315/282

FOREIGN PATENT DOCUMENTS

JP 2002-231013 A 8/2002

* cited by examiner

*Primary Examiner*—Wilson Lee
(74) *Attorney, Agent, or Firm*—Sughrue Mion, PLLC

(57) ABSTRACT

There is provided a vehicular lamp that can flow an electric current having a predetermined variation ratio into each of a plurality of semiconductor light-emitting element units and can individually illuminate each of the plurality of semiconductor light-emitting element units. The vehicular lamp includes a first and a second semiconductor light-emitting element units that are connected to each other in parallel, a switching regulator transformer operable to supply electric power to the first and the second semiconductor light-emitting element units, a first secondary side transformer that magnetically couples a first power supply path from the switching regulator transformer to the first semiconductor light-emitting element unit and a second power supply path from the switching regulator transformer to the second semiconductor light-emitting element unit in order to regulate a current variation ratio between these paths, and a first switch operable to control whether the power is supplied to the first semiconductor light-emitting element unit, in which the first switch is provided at least on the first power supply path.

7 Claims, 8 Drawing Sheets

VEHICULAR LAMP

This patent application claims priority from a Japanese Patent Application No. 2004-125972 filed on Apr. 21, 2004, the contents of which are incorporated herein by reference.

BACKGROUND OF THE INVENTION

1. Field of the Invention

The present invention relates to a vehicular lamp. More specifically, the present invention relates to a vehicular lamp for use in a vehicle.

2. Description of Related Art

Conventionally, a vehicular lamp that uses a semiconductor light-emitting element such as an LED (Light Emitting Diode) is known as disclosed, for example, in Japanese Patent Laid-Open No. 2002-231013. The LED generates a forward voltage based on a predetermined threshold voltage on both ends thereof during its lighting.

The forward voltage generated on the LED has wide individual variation. Therefore, in the vehicular lamp, the LED can be illuminated by a current control method in order to correspond to the variation of the forward voltage, in some cases. Moreover, in the vehicular lamp, for example, a plurality of LEDs connected to one another in parallel may be used, because of light distribution design, in some cases. In this case, assuming that a scheme for supplying an electric current to each line in several lines is set by separate circuits, there has been a problem that circuit scale increases in some cases. In this way, there has also been a problem that a cost of the vehicular lamp increases in some cases.

SUMMARY OF THE INVENTION

Therefore, it is an object of the present invention to provide a vehicular lamp that can solve the foregoing problems. The above and other objects can be achieved by combinations described in the independent claims. The dependent claims define further advantageous and exemplary combinations of the present invention.

According to the first aspect of the present invention, there is provided a vehicular lamp. The vehicular lamp includes: a first and a second semiconductor light-emitting element units that are connected to each other in parallel; a switching regulator transformer operable to supply electric power to the first and the second semiconductor light-emitting element units; a first secondary side transformer that magnetically couples a first power supply path from the switching regulator transformer to the first semiconductor light-emitting element unit and a second power supply path from the switching regulator transformer to the second semiconductor light-emitting element unit in order to regulate a current variation ratio between these paths; and a first switch operable to control whether the power is supplied to the first semiconductor light-emitting element unit, in which the first switch is provided at least on the first power supply path.

The vehicular lamp may further include a control unit operable to supply an electric current smaller than that when the first switch is ON to a primary side of the switching regulator transformer when the first switch is OFF.

The vehicular lamp may further include: a third semiconductor light-emitting element unit that is connected to the first and the second semiconductor light-emitting element units in parallel; and a second secondary side transformer that magnetically couples a third power supply path from the switching regulator transformer to the third semiconductor light-emitting element unit and the second power supply path in order to regulate a current variation ratio between these paths.

The vehicular lamp may further include a third secondary side transformer that magnetically couples the first power supply path and the third power supply path in order to regulate a current variation ratio between these paths.

The vehicular lamp may further include a second switch that is provided on the second power supply path.

The vehicular lamp may further include a third switch that is provided on the third power supply path.

The summary of the invention does not necessarily describe all necessary features of the present invention. The present invention may also be a sub-combination of the features described above.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
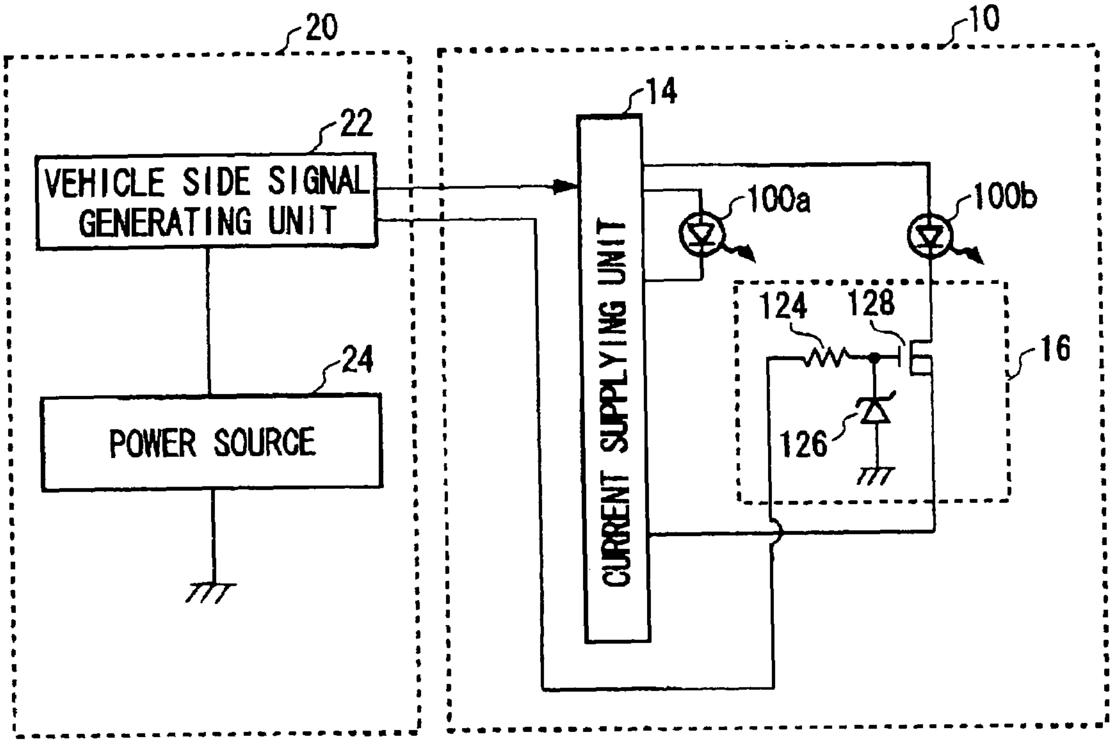
FIG. 1 is a block diagram showing a configuration of a vehicular lamp according to an embodiment of the present invention.

FIG. 1 shows a block diagram showing a configuration of a vehicular lamp 10 according to an embodiment of the present invention along with a vehicle main body 20. The object of the present embodiment is to provide the vehicular lamp 10 that can flow an electric current having a predetermined variation ratio into each of a plurality of LED units and can individually illuminate each of the plurality of LED units. The vehicular lamp 10 is used for a vehicle such as an automobile. The vehicle main body 20 includes a vehicle side signal generating unit 22 and a power source 24. The power source 24 is, e.g., a battery in-vehicle, and supplies electric power to the vehicle side signal generating unit 22 and the vehicular lamp 10. The vehicle side signal generating unit 22 generates a signal for turning on or off the vehicular lamp 10 according to a traveling state of the vehicle. In this example, the vehicle side signal generating unit 22 applies a High voltage to the vehicular lamp 10 when turning on a head lamp and applies a Low voltage to the vehicular lamp 10 when turning off the head lamp.

The vehicular lamp 10 includes a current supplying unit 14, a switch 16, and a plurality of LED units 100*a* and 100*b*. The LED unit 100*a* is, e.g., a light source for a low beam of a headlamp for an automobile, and the LED unit 100*b* is, e.g., a light source for a high beam of a headlamp for an automobile. In addition, the LED unit 100*b* is an example of a first semiconductor light-emitting element unit in the present invention, and the LED unit 100*a* is an example of a second semiconductor light-emitting element unit in the present invention.

The current supplying unit 14 has a plurality of outputs, and each of the plurality of outputs is connected to each of the LED units 100*a* and 100*b*. Then, the current supplying unit 14 supplies an electric current with a predetermined ratio to each of the LED units 100*a* and 100*b* connected to each of the outputs. Each of the plurality of LED units 100*a* and 100*b* has one element or a plurality of LED elements. Each of the plurality of outputs of the current supplying unit 14 is connected to the LED unit 100*a*, the LED unit 100*b*, and the switch 16. When the current supplying unit 14 receives the High voltage from the vehicle side signal generating unit 22, the current supplying unit 14 illuminates the LED unit 100*a*.

The switch 16 is provided between a downstream end of the LED unit 100*b* and the current supplying unit 14, and is serially connected to the LED unit 100*b*. The switch 16 has a resistor 124, a Zener diode 126, and an nMOS transistor 128. A drain terminal of the nMOS transistor 128 is connected to the downstream end of the LED unit 100*b*, and its source terminal is connected to the current supplying unit 14. A gate terminal of the nMOS transistor 128 is connected to the vehicle side signal generating unit 22 via the resistor 124. Thereby, when the High voltage is received from the vehicle side signal generating unit 22 via the resistor 124, the nMOS transistor 128 flows an electric current into the LED unit 100*b* to illuminate the LED unit 100*b*. Moreover, a cathode of the Zener diode 126 is connected to the gate terminal of the nMOS transistor 128, and its anode is grounded. In this way, the Zener diode 126 prevents applying an overvoltage to the gate terminal of the nMOS transistor 128.

By such a configuration, it is possible to individually illuminate the plurality of LED units 100 using one current supplying unit 14 with the plurality of outputs. Moreover, the vehicular lamp 10 can thereby be miniaturized.

In addition, in this example, although the vehicle side signal generating unit 22 applies the High voltage or the Low voltage to the vehicular lamp 10 according to a control state of on and off of the headlamp, in another example, the vehicle side signal generating unit 22 may apply the High voltage or the Low voltage to the vehicular lamp 10 according to a turning angle of steering, the velocity of a traveling wheel, the height of car (an attitude of a vehicle), position information from a car navigation system, external brightness of a vehicle, information on obstacles detected from an infrared sensor and a camera, a control state of on and off of a turn signal, and so on. Moreover, the vehicle side signal generating unit 22 may apply a medium voltage between the High voltage and the Low voltage to the vehicular lamp 10 according to the described states of the vehicle.

Figure 2:
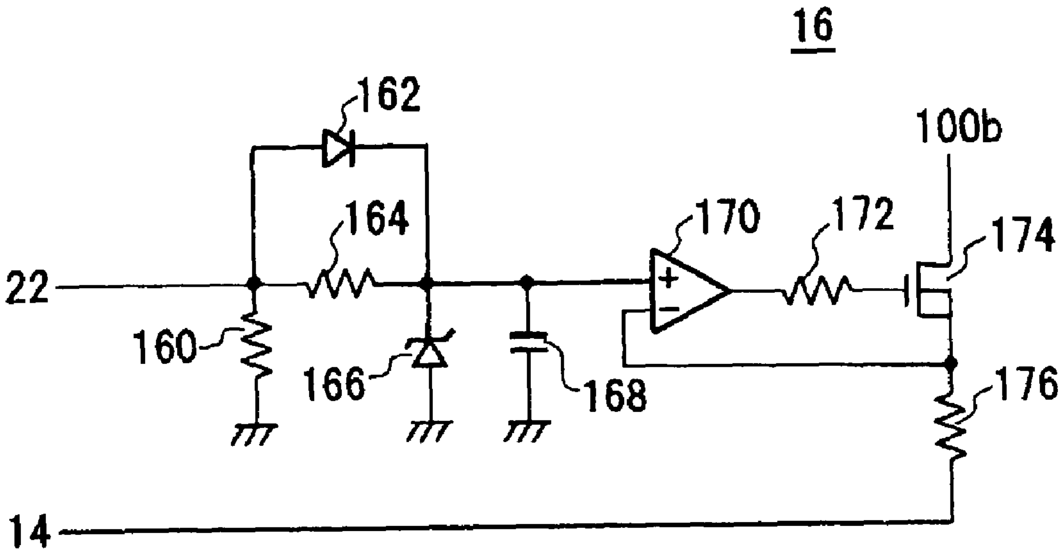
FIG. 2 is a circuit diagram showing another example of a configuration of a switch.

FIG. 2 shows another example of a configuration of the switch 16. In this example, the LED unit 100*b* is used as a light source for additional lighting. The switch 16 includes a plurality of resistors 160, 164, 172, and 176, a diode 162, a Zener diode 166, a capacitor 168, an operational amplifier 170, and an nMOS transistor 174. An anode of the diode 162 is connected to the vehicle side signal generating unit 22, and its cathode is connected to a positive input terminal of the operational amplifier 170. The resistor 164 is connected to the diode 162 in parallel. The resistor 160 is connected between the anode of the diode 162 and ground potential. A cathode of the Zener diode 166 is connected to the positive input terminal of the operational amplifier 170, and its anode is grounded. One end of the capacitor 168 is connected to the positive input terminal of the operational amplifier 170, and another end is grounded. By such a configuration, when the vehicle side signal generating unit 22 applies the voltage from Low to High to the capacitor 168 via the resistor 164, the capacitor 168 is charged via the diode 162. Moreover, when the vehicle side signal generating unit 22 applies the voltage from High to Low to the capacitor 168 via the resistor 164, the capacitor 168 is discharged via the resistor 164 and the resistor 160 by time constant larger than time constant by which it is charged via the diode 162.

A drain terminal of the nMOS transistor 174 is connected to the downstream end of the LED unit 100*b*, and its source terminal is connected to the current supplying unit 14 via the resistor 176. A gate terminal of the nMOS transistor 174 is connected to an output terminal of the operational amplifier 170 via the resistor 172. A negative input terminal of the operational amplifier 170 is connected to a node between the source terminal of the nMOS transistor 174 and the resistor 176. Thereby, the operational amplifier 170 regulates the voltage of the gate terminal of the nMOS transistor 174 so that the voltage received through the positive input terminal thereof and the voltage generated on the resistor 176 are substantially same as each other. By such a configuration, when the vehicle side signal generating unit 22 applies the voltage from Low to High to the switch 16, the nMOS transistor 174 flows the current into the LED unit 100*b* to illuminate the LED unit 100*b* as the voltage of the capacitor 168 rises. Moreover, when the vehicle side signal generating unit 22 applies the voltage from High to Low to the switch 16, the nMOS transistor 174 gradually reduces the current flowing into the LED unit 100*b* to gradually reduce a light amount of the LED unit 100*b* as the voltage of the capacitor 168 gradually falls. In this way, when turning off the LED unit 100*b*, it is possible to cause the driver's eyes to get gradually used to darkness of the direction where the LED unit 100*b* has irradiated light. Therefore, security of night drive of the vehicle can be improved.

In addition, in this example, although the anode of the diode 162 is connected to the vehicle side signal generating unit 22 and its cathode is connected to the positive input terminal of the operational amplifier 170, in another example, the anode of the diode 162 may be connected to the positive input terminal of the operational amplifier 170 and its cathode may be connected to the vehicle side signal generating unit 22. In this case, a resistance value of the resistor 160 is set to have a value smaller than that of the resistor 164. Thereby, when the vehicle side signal generating unit 22 applies the voltage from Low to High to the switch 16, the capacitor 168 is charged via the resistor 164 by time constant larger than time constant by which it is discharged via the diode 162 and the resistor 160. Therefore, when the vehicle side signal generating unit 22 applies the voltage from Low to High to the switch 16, the nMOS transistor 174 gradually increases the current flowing into the LED unit 100*b* to gradually increase a light amount of the LED unit 100*b* as the voltage of the capacitor 168 gradually increases. In this way, eyes of a walker and a driver of an oncoming car can gradually be adjusted to brightness of the LED unit 100*b*. Furthermore, if there is not the diode 162, when the vehicle side signal generating unit 22 applies the voltage from Low to High or the voltage from High to Low to the switch 16, the current flowing into the LED unit 100*b* can gradually be increased or decreased to gradually increase or decrease a light amount of the LED unit 100*b*.

Figure 3:
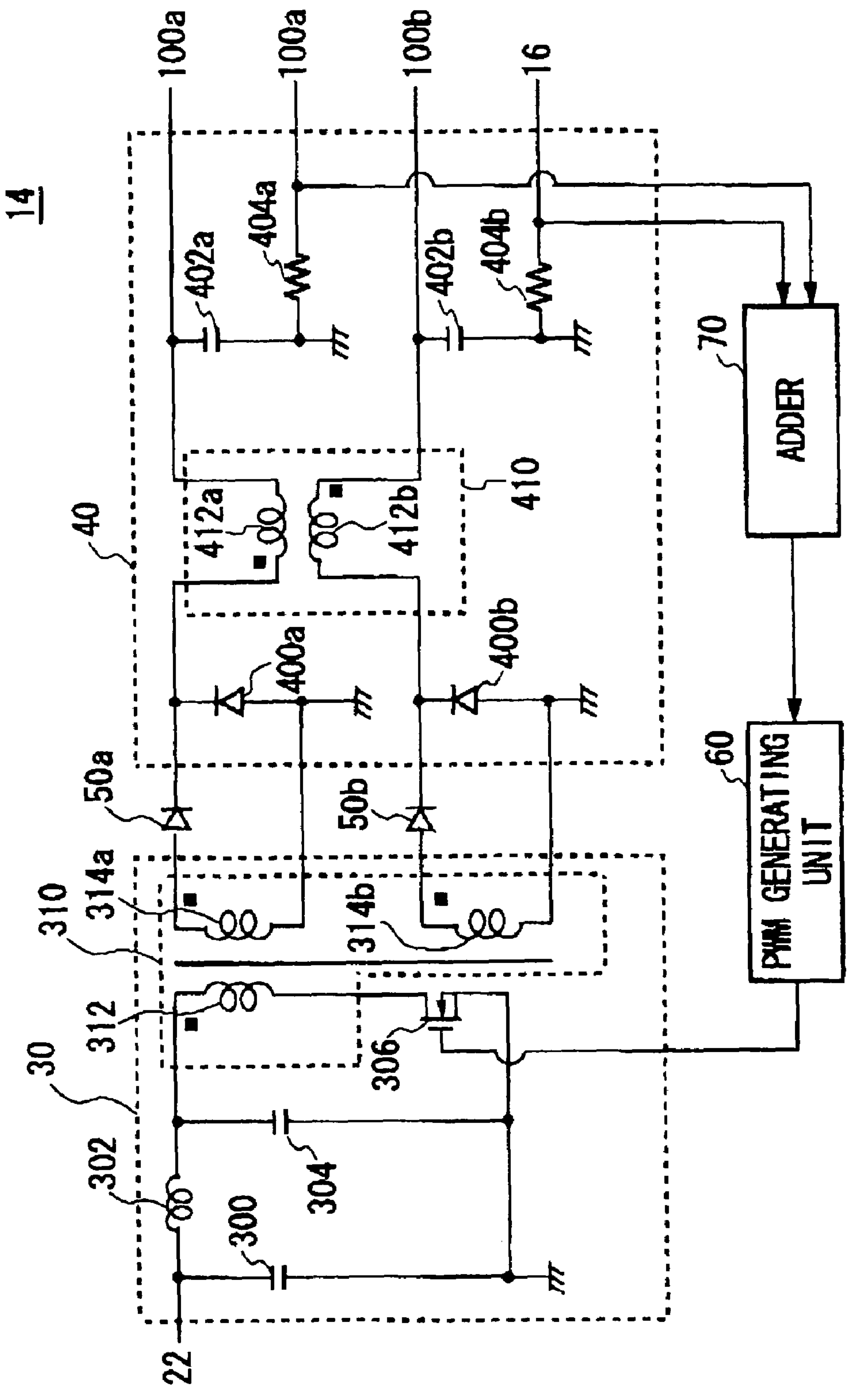
FIG. 3 is a circuit diagram exemplary showing a detailed configuration of a current supplying unit.

FIG. 3 is a circuit diagram exemplary showing a detailed configuration of the current supplying unit 14. The current supplying unit 14 includes a voltage outputting unit 30, a current ratio setting unit 40, a pulse width modulation generating unit 60, an adder 70, and a plurality of diodes 50*a* and 50*b*. The voltage outputting unit 30 has a coil 302, a plurality of capacitors 300 and 304, a switching element 306, and a switching regulator transformer 310. The coil 302 is serially connected to a primary coil 312 of the switching regulator transformer 310, and supplies the voltage received from the power source 24 via the vehicle side signal generating unit 22 to the switching regulator transformer 310. The capacitors 300 and 304 smooth a voltage on both ends of the coil 302. The switching element 306 is serially connected to the primary coil 312 of the switching regulator transformer 310, and is turned on or off according to a PWM signal output from the pulse width modulation generating unit 60 to intermittently change the current flowing into the primary coil 312.

The switching regulator transformer 310 has the primary coil 312 and a plurality of secondary coils 314*a* and 314*b*. The primary coil 312 flows the current when the switching element 306 is turned on. The plurality of secondary coils 314*a* and 314*b* is provided corresponding to the plurality of LED units 100*a* and 100*b*, and applies the voltage according to the current flowing into the primary coil 312 to the corresponding LED units 100 via the diodes 50 and the current ratio setting unit 40. In this way, the voltage outputting unit 30 supplies electric power to each of the plurality of LED units 100*a* and 100*b*. In addition, each of the plurality of secondary coils 314*a* and 314*b* may have the number of turns different from each other.

Each of the plurality of diodes 50*a* and 50*b* is provided corresponding to each of the plurality of secondary coils 314*a* and 314*b*, and is also connected between the secondary coil 314 and the current ratio setting unit 40 in the forward direction. Thereby, the diodes 50 supply the power output from the corresponding secondary coils 314 to the LED units 100 via the current ratio setting unit 40.

The current ratio setting unit 40 has a plurality of capacitors 402*a* and 402*b*, a plurality of resistors 404*a* and 404*b*, an output side transformer 410, and a plurality of diodes 400*a* and 400*b*. The plurality of capacitors 402*a* and 402*b* and the plurality of resistors 404*a* and 404*b* are provided corresponding to each of the plurality of LED units 100*a* and 100*b*. Then, the current flowing into the corresponding LED units 100 is smoothed by each of the capacitors 402. Moreover, each of the resistors 404 is serially connected to the corresponding LED units 100, and generates the voltage according to the current flowing into the corresponding LED units 100 on its both ends.

The output side transformer 410 has a plurality of output side coils 412*a* and 412*b*. Each of the plurality of output side coils 412*a* and 412*b* is provided corresponding to each of the plurality of LED units 100*a* and 100*b*. The output side coils 412 are serially connected to the corresponding LED units 100, and flows the current supplied from the voltage outputting unit 30 into the corresponding LED units 100. The output side coils 412*a* and 412*b* are magnetically coupled with each other. Moreover, the output side coil 412*b* is wound up in a direction opposite to the output side coil 412*a*. Here, for example, assuming that the number of turns of each of the output side coils 412*a* and 412*b* is No1 and No2 and the current flowing into each of the LED units 100*a* and 100*b* is Io1 and Io2, a relationship of Io1/Io2 =No2/No1 is obtained. Thus, the output side coil 412*b* flows the current with the size of inverse ratio to the number of turns of the output side coil 412*b* to the output side coil 412*a* in order to regulate a current ratio between the LED units 100*a* and 100*b*. In addition, the output side transformer 410 is an example of a first secondary side transformer in the present invention.

The plurality of diodes 400*a* and 400*b* is provided corresponding to the plurality of secondary coils 314*a* and 314*b*, and their anodes are connected to low potential side outputs of the secondary coils 314 and their cathodes are connected to cathodes of the diodes 50. In this example, the diodes 400 constitute a forward converter along with the switching regulator transformer 310, the switching element 306, the diodes 50, and the output side coils 412. Then, the diode 400 discharges energy that is accumulated in leakage inductances of the output side coils 412 during turning on the switching element 306 to the capacitors 402 during turning off the switching element 306.

The adder 70 detects the voltage generated on the both ends of each of the resistors 404 to detect the current flowing into the LED units 100 corresponding to each of the resistors 404. The pulse width modulation generating unit 60 controls on time and off time of the switching element 306, e.g., using the known PWM control or PFM control, according to the current detected by the adder 70. The pulse width modulation generating unit 60 controls the electric power to be supplied to the current ratio setting unit 40 by means of the switching regulator transformer 310 by controlling the switching element 306 so that the value of current detected by the adder 70 is stabilized. In this way, when the LED unit 100*b* is turned off by turning off the nMOS transistor 128 of the switch 16, the pulse width modulation generating unit 60 supplies the current less than that being supplied to the primary coil 312 when the LED unit 100*b* is turned on by turning on the nMOS transistor 128 to the primary coil 312. In addition, the pulse width modulation generating unit 60 is an example of a control unit in the present invention.

Here, in the vehicular lamp 10, the plurality of LED units 100*a* and 100*b* in which the required voltage value and current value are different from each other can be used, e.g., due to light distribution design in some cases. In this case, assuming that the current supplying unit 14 is individually arranged for every LED unit 100, that causes the cost rise. However, according to this example, since one current supplying unit 14 individually includes the output side coil 412*a* and the output side coil 412*b* for each of the plurality of LED units 100*a* and 100*b*, it is possible to regulate the current to be supplied to the each of the LED units 100 at a desired ratio. Thereby, it is possible to supply the desired current to each of the LED units 100 without providing a switching regulator for each LED unit 100. Therefore, according to this example, the plurality of LED units 100 can suitably be illuminated at low cost. Moreover, in this way, the vehicular lamp 10 can be provided at low cost.

Moreover, since the switch 16 controls whether the current is supplied to the LED unit 100*b*, the current can be supplied to the LED units 100*a* and 100*b* at the current ratio regulated by the output side transformer 410 when the switch 16 is turned on, and the power supplied from the switching regulator transformer 310 can be supplied to the LED unit 100*a* when the switch 16 is turned off.

In addition, in this example, although the plurality of secondary coils 314, the diodes 50, and the diodes 400 are respectively provided in each output, the secondary coil 314, the diode 50, and the diode 400 may be provided in each output in common with one another.

Figure 4:
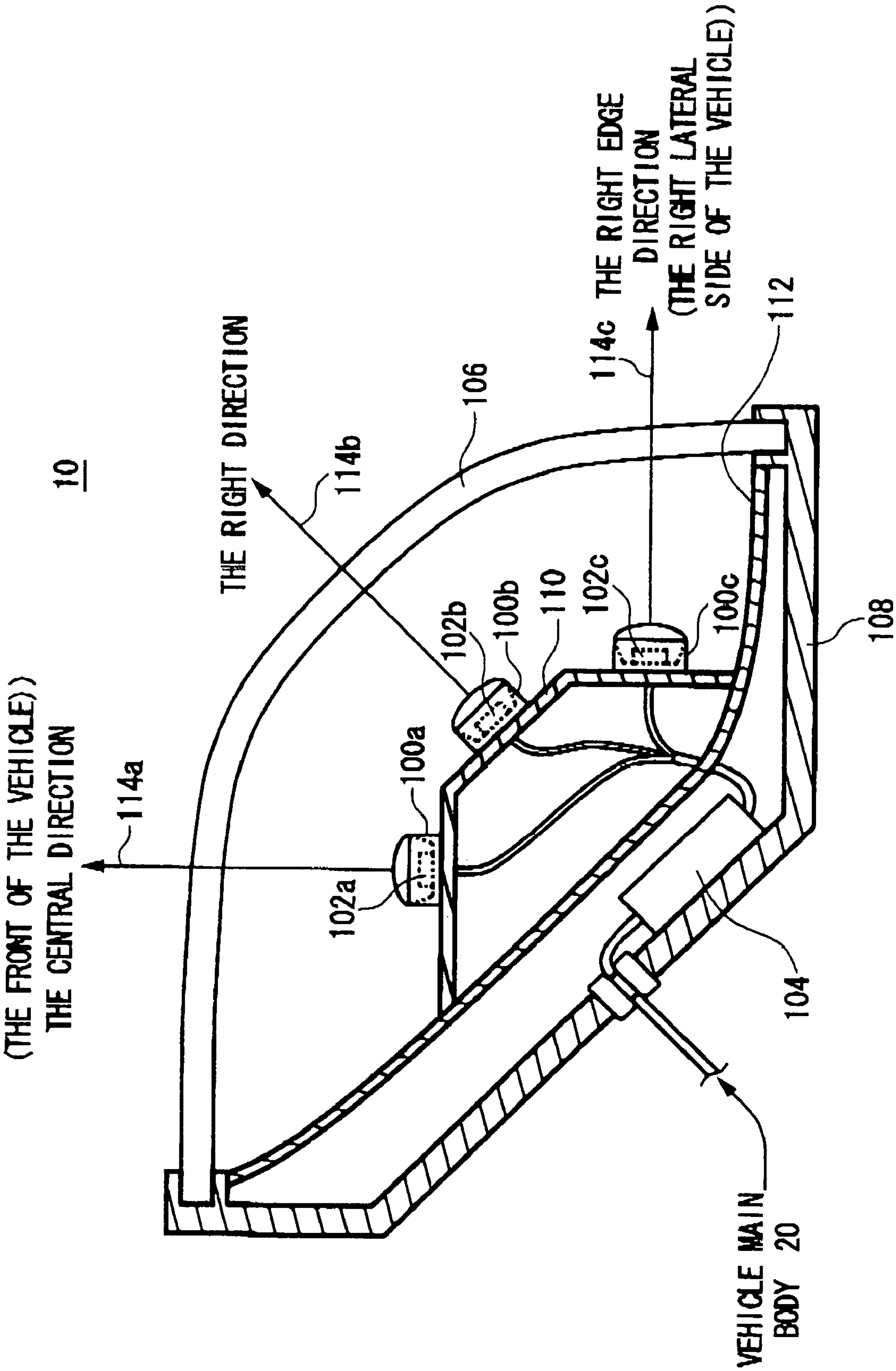
FIG. 4 is a horizontal sectional view showing another example of a configuration of the vehicular lamp.

FIG. 4 is a horizontal sectional view showing another example of a configuration of the vehicular lamp 10. In this example, the vehicular lamp 10 is an additional lamp for lighting that is attached in front of the vehicle on the right, and includes a plurality of LED units 100*a* to 100*c*, an outer lens 106, a lamp body 108, an extension reflector 112, and a light amount controlling unit 104. A light source supporting section 110 supports each of the plurality of LED units 100*a* to 100*c* toward the directions different from one another. In this example, the light source supporting section 110 supports the LED unit 100*a* toward the front of the vehicle (the central direction), supports the LED unit 100*c* toward the right lateral direction of the vehicle (the right edge direction), and supports the LED unit 100*b* toward the front of the vehicle on the diagonal right (the right direction) between the central direction and the right edge direction.

Each of the plurality of LED units 100*a* to 100*c* respectively has a plurality of LED elements 102*a* to 102*c*, and irradiates light from the LED elements 102 in the direction in which each unit faces. For example, the LED element 102*a* irradiates the light in the central direction as shown in the arrow 114*a*. The LED element 102*b* irradiates the light in the right direction as shown in the arrow 114*b*. Moreover, the LED element 102*c* irradiates the light in the right edge direction as shown in the arrow 114*c*. In addition, each of the LED elements 102 may irradiate the light in an area of which the center is passed by the corresponding arrows 114. In addition, the LED unit 100*a* is an example of a first semiconductor light-emitting element unit in the present invention, the LED unit 100*b* is an example of a second semiconductor light-emitting element unit in the present invention, and the LED unit 100*c* is an example of a third semiconductor light-emitting element unit in the present invention.

The outer lens 106 is provided in common for the plurality of LED units 100*a* to 100*c*, and is formed of a translucent material so that it covers the plurality of LED units 100*a* to 100*c* from the front of the vehicle. The lamp body 108 forms a light room of the vehicular lamp 10 along with the outer lens 106, and the plurality of LED units 100*a* to 100*c* is accommodated within the light room. The extension reflector 112 is formed to cover the plurality of LED units 100*a* to 100*c* from the rear so as to cover up the clearance in the rear of the LED units 100.

The light amount controlling unit 104 receives a vehicle side signal from the vehicle main body 20 side, and controls turning on or off each of the plurality of LED units 100*a* to 100*c* according to this vehicle side signal. For example, the light amount controlling unit 104 changes an amount of light emitted from each of the plurality of LED units 100*a* to 100*c* according to the vehicle side signal. In this example, the light amount controlling unit 104 receives a voltage according to a turning angle of steering of the vehicle as the vehicle side signal. Then, the light amount controlling unit 104 changes a light amount of the plurality of LED units 100*a* to 100*c* according to the voltage received from the vehicle main body 20.

For example, when the turning angle of steering is zero degree and the vehicle goes straight ahead, the light amount controlling unit 104 turns off all of the plurality of LED units 100*a* to 100*c*. Then, when the steering is turned to the right side, the light amount controlling unit 104 gradually increases an amount of light emitted from the LED unit 100*a* according to an increase of the turning angle of steering. In this way, the vehicular lamp 10 gradually increases light emitted in the central direction.

Moreover, when the turning angle of steering exceeds a predetermined angle, the light amount controlling unit 104 turns on the LED unit 100*b*. Then, when the steering is further turned to the right side, the light amount controlling unit 104 gradually increases an amount of light emitted form the LED unit 100*b* according to an increase of the turning angle of steering. In this way, the vehicular lamp 10 gradually increases light emitted in the right direction.

Moreover, after the LED unit 100*b* is turned on, when the steering is further turned to the right side by a predetermined amount, the light amount controlling unit 104 further turns on the LED unit 100*c*. Moreover, the light amount controlling unit 104 gradually increases an amount of light emitted form the LED unit 100*c* according to an increase of the turning angle of steering. In this way, the vehicular lamp 10 gradually increases light emitted in the right edge direction.

Thus, the vehicular lamp 10 changes light distribution according to the turning angle of steering. In this case, for example, light distribution of the vehicular lamp 10 can be shown as if it moves from the center to the right side. Therefore, according to this example, it is possible to provide the vehicular lamp 10 with high merchantability.

Figure 5:
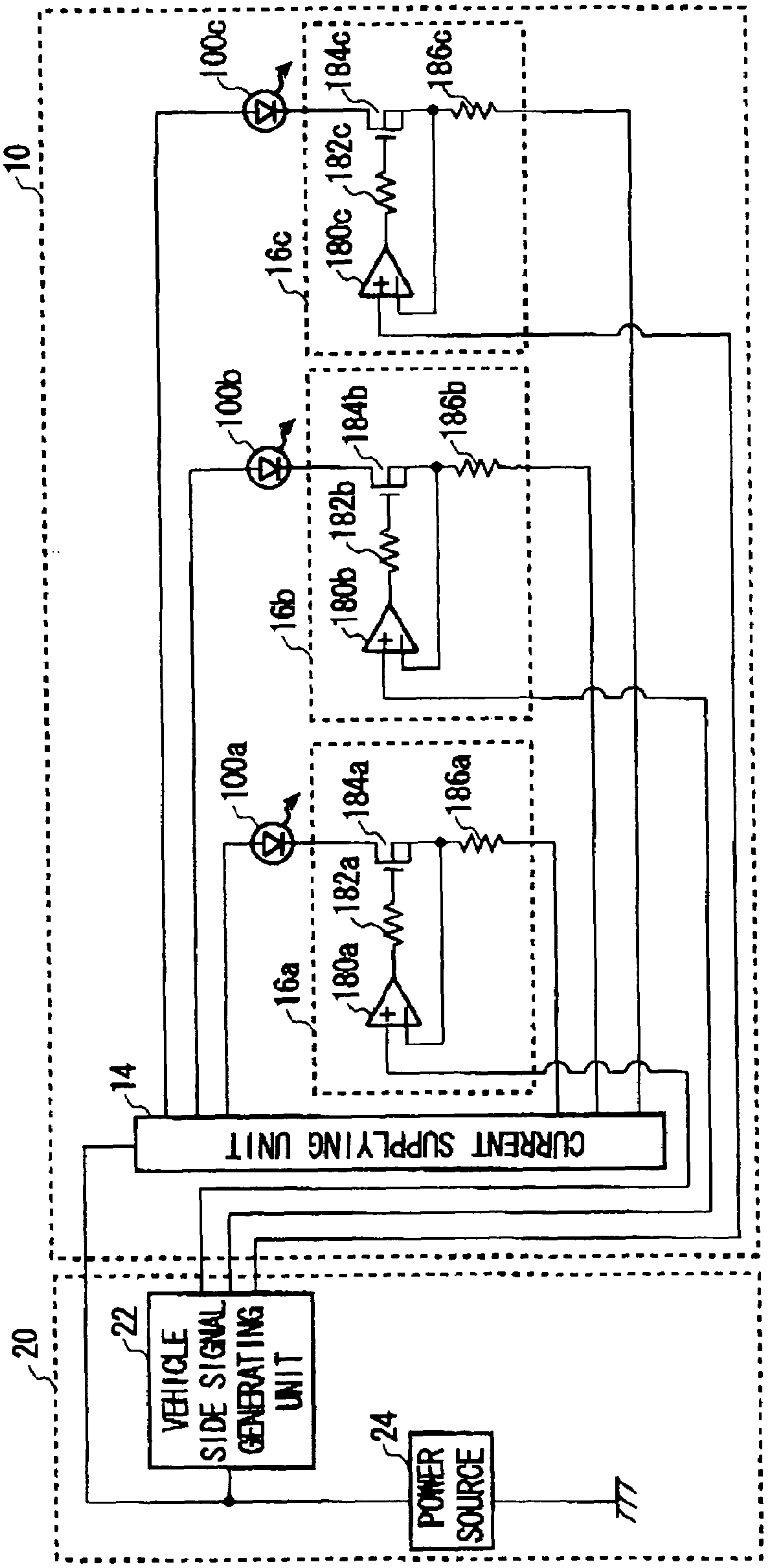
FIG. 5 is a block diagram showing another example of a detailed configuration of the vehicular lamp.

FIG. 5 is a block diagram showing another example of a detailed configuration of the vehicular lamp 10. In addition, since the components of FIG. 5 having the same reference numbers as those of FIG. 1 have the same or similar functions as or to those of FIG. 1, their descriptions will be omitted. The vehicle side signal generating unit 22 generates, e.g., a PWM signal according to the turning angle of steering, and converts the generated PWM signal into a DC voltage by integrating the signal using a low pass filter in order to apply the voltage to each of the switches 16*a* to 16*c*. Each of the switches 16*a* to 16*c* is provided in correspondence with the LED units 100*a* to 100*c*. Each of the plurality of switches 16*a* to 16*c* is provided in correspondence with each of the plurality of outputs of the current supplying unit 14.

The switch 16*a* has an operational amplifier 180*a*, a resistor 182*a*, an nMOS transistor 184*a*, and a resistor 186*a*. The switch 16*b* has an operational amplifier 180*b*, a resistor 182*b*, an nMOS transistor 184*b*, and a resistor 186*b*. The switch 16*c* has an operational amplifier 180*c*, a resistor 182*c*, an nMOS transistor 184*c*, and a resistor 186*c*. Drain terminals of the nMOS transistors 184 are connected to downstream ends of the LED units 100, and their source terminals are connected to the current supplying unit 14 via the resistors 186. Gate terminals of the nMOS transistors 184 are connected to output terminals of the operational amplifiers 180 via the resistors 182. Negative input terminals of the operational amplifiers 180 are connected to nodes between the source terminals of the nMOS transistors 184 and the resistors 186. Positive input terminals of the operational amplifiers 180 receive the DC voltage according to the turning angle of steering from the vehicle side signal generating unit 22. Thereby, the operational amplifiers 180 regulate the voltage of the gate terminals of the nMOS transistors 184 so that the voltage received by the positive input terminals and the voltage generated on the resistors 186 are substantially same as each other. Therefore, each of the LED units 100 emits light by an amount of light according to the turning angle of steering. In addition, the switch 16*a* is an example of a first switch in the present invention, the switch 16*b* is an example of a second switch in the present invention, and the switch 16_c_ is an example of a third switch in the present invention.

Figure 6A:
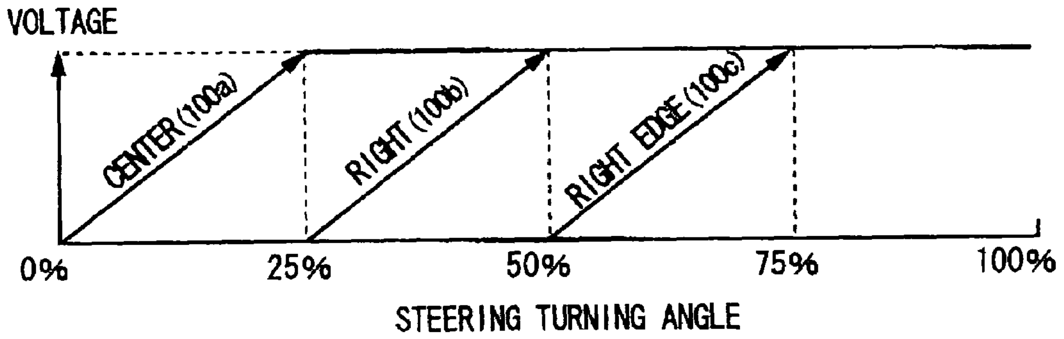
FIGS. 6A and 6B are conceptual diagrams exemplary explaining an operation of the vehicular lamp.
Figure 6B:
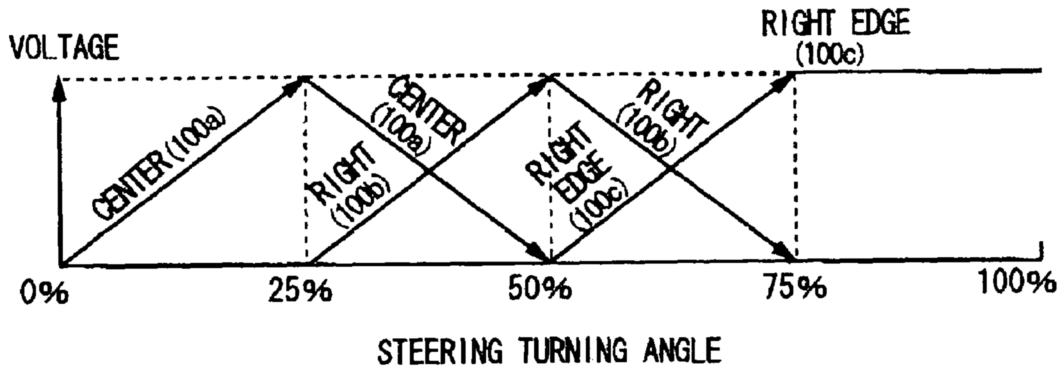

FIGS. 6A and 6B are conceptual diagrams exemplary explaining an operation of the vehicular lamp 10. In addition, in graphic charts shown in FIGS. 6A and 6B, the steering turning angle is a ratio to a maximum turning angle of the right direction. Moreover, in this example, the current flowing into the LED elements 102 through the switches 16 by means of the voltage applied from the vehicle side signal generating unit 22 to the switches 16 is sufficiently smaller than a maximum current of the LED elements 102. Therefore, according to the voltage applied from the vehicle side signal generating unit 22, the LED elements 102 emit light with a light amount substantially proportional to the voltage.

Referring to FIG. 6A, as the steering turning angle gradually increases while the steering turning angle increases from 0% to 25%, the vehicle side signal generating unit 22 gradually increases the voltage being supplied to the switch 16_a_ till a preset maximum voltage. The switch 16_a_ gradually increases the current flowing into the LED unit 100_a_ that emits light in the central direction in order to emit light from the LED unit 100_a_ with a light amount gradually increased. In this case, the vehicle side signal generating unit 22 keeps the voltage supplied to the switches 16_b_ and 16_c_ zero.

Moreover, as the steering turning angle gradually increases while the steering turning angle increases from 25% to 50%, the vehicle side signal generating unit 22 gradually increases the voltage being supplied to the switch 16_b_ till the maximum voltage in order to gradually increase an amount of light from the LED unit 100_b_ that emits light in the right direction. In this case, the vehicle side signal generating unit 22 keeps the voltage supplied to the switch 16_c_ zero and also keeps the voltage supplied to the switch 16_a_ the maximum voltage.

As the steering turning angle gradually increases while the steering turning angle increases from 50% to 75%, the vehicle side signal generating unit 22 gradually increases the voltage being supplied to the switch 16_c_ till the maximum voltage in order to gradually increase an amount of light from the LED unit 100_c_ that emits light in the right edge direction. In this case, the vehicle side signal generating unit 22 keeps the voltage supplied to the switches 16_a_ and 16_b_ the maximum voltage.

Thus, the vehicle side signal generating unit 22 individually illuminates each of the plurality of LED units 100_a_ to 100_c_ according to the turning angle of steering. Thereby, the light distribution of the vehicular lamp 10 can be changed to move from the center to the right direction.

Referring to FIG. 6B, the vehicle side signal generating unit 22 increases the voltage that is supplied to the switches 16 to control the current flowing into the LED units 100 till the maximum voltage, and then gradually reduces according to the further increase of the steering turning angle. Thereby, the light distribution can further smoothly move from the central direction to the right edge direction. Moreover, since the number of LED units 100 illuminated simultaneously is reduced, a power consumption of the vehicular lamp 10 can be reduced.

Figure 7:
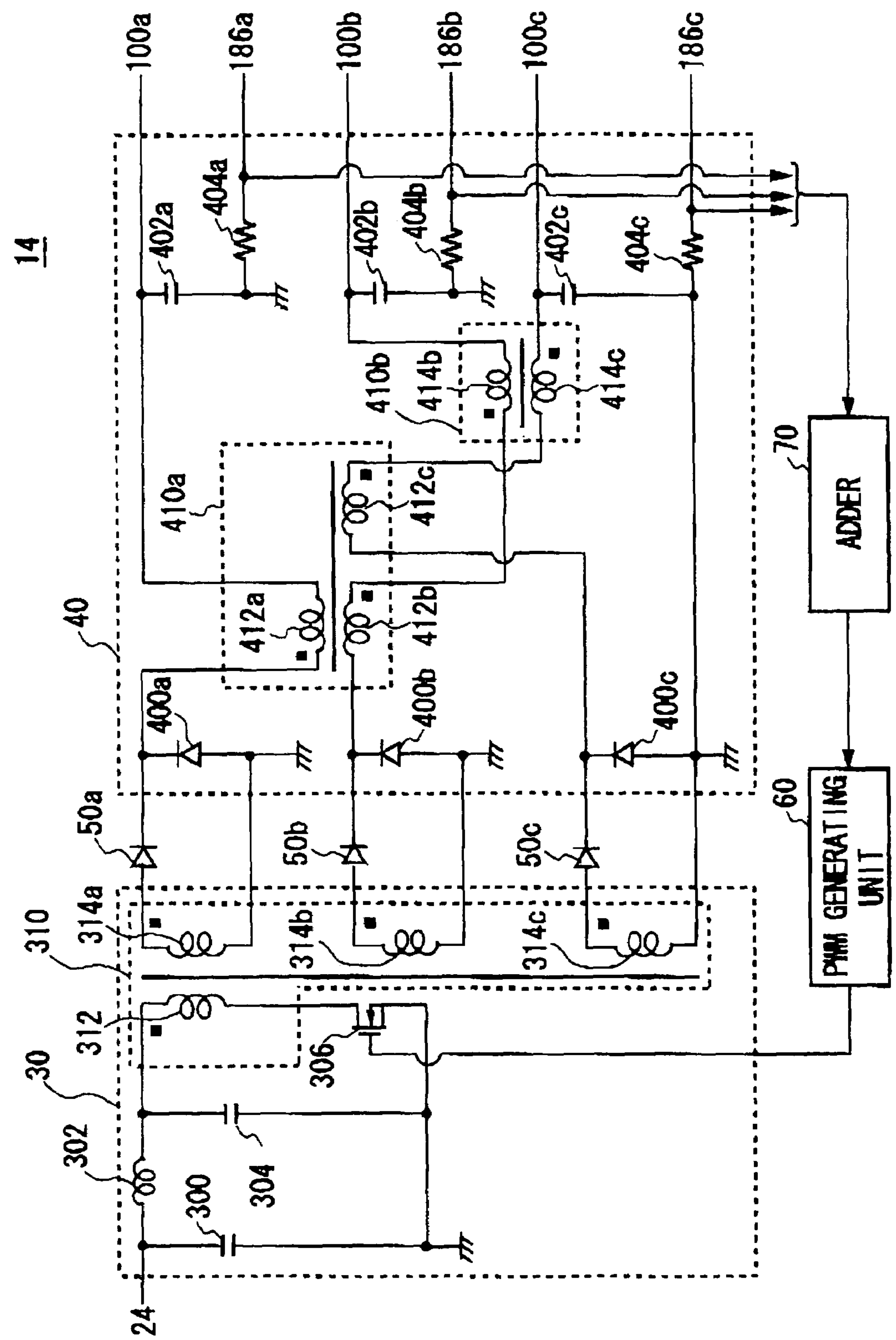
FIG. 7 is a circuit diagram exemplary showing a detailed configuration of the current supplying unit.

FIG. 7 is a circuit diagram exemplary showing a detailed configuration of the current supplying unit 14. In addition, since the components of FIG. 7 having the same reference numbers as those of FIG. 3 have the same or similar functions as or to those of FIG. 3, their descriptions will be omitted. The current supplying unit 14 includes the voltage outputting unit 30, the current ratio setting unit 40, the pulse width modulation generating unit 60, the adder 70, and a plurality of diodes 50_a_ to 50_c_.

The switching regulator transformer 310 has the primary coil 312 and a plurality of secondary coils 314_a_ to 314_c_. The plurality of secondary coils 314_a_ to 314_c_ is provided corresponding to the plurality of LED units 100_a_ to 100_c_, and applies the voltage according to the current flowing into the primary coil 312 to the corresponding LED units 100 via the diodes 50 and the current ratio setting unit 40. In this way, the voltage outputting unit 30 supplies electric power to each of the plurality of LED units 100_a_ to 100_c_. In addition, each of the plurality of secondary coils 314_a_ to 314_c_ may have the number of turns different from one another. Moreover, in this example, although the switching regulator transformer 310 has three secondary coils 314, in another example, the switching regulator transformer 310 may have four or more secondary coils 314.

Each of the plurality of diodes 50_a_ to 50_c_ is provided corresponding to each of the plurality of secondary coils 314_a_ to 314_c_, and is connected between the secondary coils 314 and the current ratio setting unit 40 in the forward direction. Thereby, the diodes 50 supply the power output from the corresponding secondary coils 314 to the LED units 100 via the current ratio setting unit 40.

The current ratio setting unit 40 has a plurality of capacitors 402_a_ to 402_c_, a plurality of resistors 404_a_ to 404_c_, output side transformers 410_a_ and 410_b_, and a plurality of diodes 400_a_ to 400_c_. The plurality of capacitors 402_a_ to 402_c_ and the plurality of resistors 404_a_ to 404_c_ are provided corresponding to each of the plurality of LED units 100_a_ to 100_c_.

The output side transformer 410_a_ has a plurality of output side coils 412_a_ to 412_c_. Each of the plurality of output side coils 412_a_ to 412_c_ is provided corresponding to each of the plurality of LED units 100_a_ to 100_c_. The output side coils 412 are serially connected to the corresponding LED units 100. The output side coils 412_a_ and 412_b_ and the output side coils 412_a_ and 412_c_ are magnetically coupled with each other. Moreover, each of the plurality of output side coils 412_b_ and 412_c_ is wound up in a direction opposite to the output side coil 412_a_. Here, for example, assuming that the number of turns of each of the output side coils 412_a_ to 412_c_ is No1, No2, and No3 and the current flowing into each of the LED units 100_a_ to 100_c_ is Io1, Io2, and Io3, a relationship of Io1=(No2*Io2+No3*Io3) is realized. Thus, the current flowing into the output side coil 412_a_ is regulated by the sum of the current with the size of inverse ratio to the number of turns of the output side coils 412_b_ and 412_c_ to the output side coil 412_a_. In addition, the output side transformer 410_a_ is an example of a first and a third secondary side transformer in the present invention.

The output side transformer 410_b_ has a plurality of output side coils 414_b_ and 414_c_. Each of the plurality of output side coils 414_b_ and 414_c_ is provided corresponding to each of the plurality of LED units 100_b_ and 100_c_. The output side coils 414 are serially connected to the corresponding LED units 100. The output side coils 414_b_ and 414_c_ are wound up in a direction opposite to each other, and are magnetically coupled with each other. In this way, the output side coil 414_c_ flows the current with the size of inverse ratio to the number of turns of the output side coil 414_c_ to the output side coil 414_b_ in order to regulate a current variation ratio between the LED units 100_b_ and 100_c_. In addition, the output side transformer 410_b_ is an example of a second secondary side transformer in the present invention.

The plurality of diodes 400_a_ to 400_c_ is provided corresponding to the plurality of secondary coils 314_a_ to 314_c_, their anodes are connected to low potential side outputs of the secondary coils 314, and their cathodes are connected to the cathodes of the diodes 50. The adder 70 detects the voltage occurring on both ends of each of the resistors 404*a* to 404*c* in order to detect the current flowing into the LED units 100*a* to 100*c* corresponding to each of the resistors 404*a* to 404*c*.

Here, since each of the switches 16*a* to 16*c* controls whether the current is supplied to each of the LED units 100*a* to 100*c*, although any two of the switches 16*a* to 16*c* are turned on, the current with a variation ratio regulated by the output side transformer 410*a* or the output side transformer 410*b* can be supplied between the two switches. Moreover, although all of the switches 16*a* to 16*c* are turned on, the current can be supplied to all of the LED units 100*a* to 100*c* at a desired variation ratio. Therefore, although one electric power is only controlled by the pulse width modulation generating unit 60, the current supplying unit 14 can always supply a desired current to the LED units 100. Furthermore, since the output side transformer 410*a* regulates a current variation ratio flowing into the LED units 100*a* and 100*b* and a current variation ratio flowing into the LED units 100*a* and 100*c* and the output side transformer 410*b* regulates a current variation ratio flowing into the LED units 100*b* and 100*c*, it is possible to determine a current variation ratio flowing into the plurality of LED units 100*a* to 100*c* with high precision in comparison with the case of regulating only a current variation ratio flowing into the LED units 100*a* and 100*c* and a current variation ratio flowing into the LED units 100*a* and 100*b*.

Figure 8:
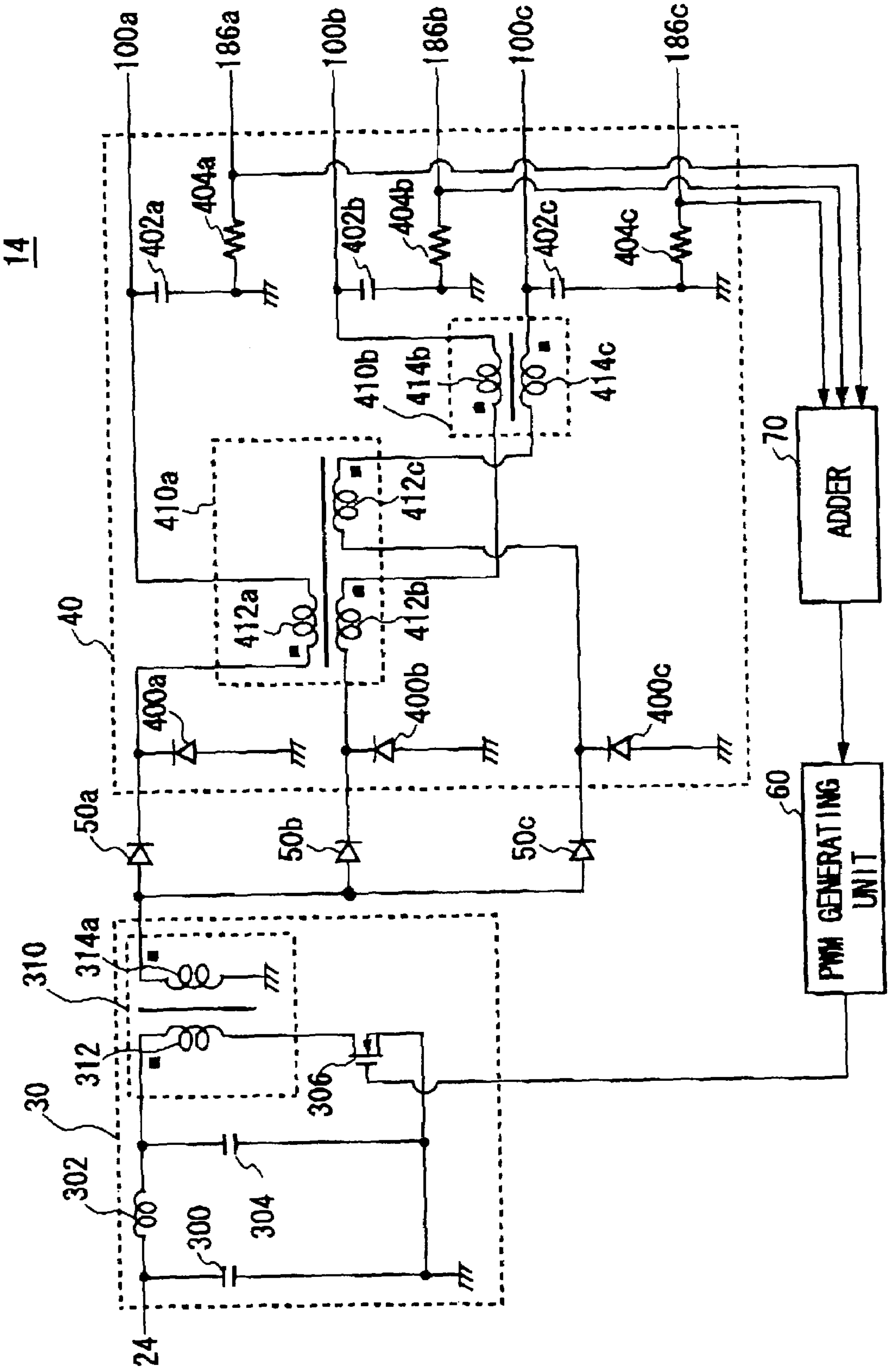
FIG. 8 is a circuit diagram showing another example of a detailed configuration of the current supplying unit.

FIG. 8 is a circuit diagram showing another example of a detailed configuration of the current supplying unit 14. In addition, since the components of FIG. 8 having the same reference numbers as those of FIG. 7 have the same or similar functions as or to those of FIG. 7, their descriptions will be omitted. A switching regulator transformer 310 has a primary coil 312 and a secondary coil 314. Each of the plurality of diodes 50*a* to 50*c* is provided corresponding to each of the plurality of LED units 100*a* to 100*c*, and is connected between the secondary coil 314 and the current ratio setting unit 40 in a forward direction.

By such a configuration, it is possible to miniaturize the switching regulator transformer 310 in comparison with the case of providing the secondary coils 314 corresponding to each of the plurality of LED units 100*a* to 100*c*. Therefore, the switching regulator transformer 310 can be produced at low cost, and thus the vehicular lamp 10 can be produced at low cost. In addition, one diode 50 and one diode 400 may be provided for the plurality of LED units 100*a* to 100*c* in common.

As is clear from the above descriptions, the vehicular lamp 10 of the present embodiment can flow an electric current having a predetermined variation ratio into each of the plurality of LED units 100 and can individually illuminate each of the plurality of LED units 100.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A vehicular lamp, comprising:

a first and a second semiconductor light-emitting element units that are connected to each other in parallel;

a switching regulator transformer operable to supply electric power to said first and said second semiconductor light-emitting element units;

a first secondary side transformer that magnetically couples a first power supply path from said switching regulator transformer to said first semiconductor light-emitting element unit and a second power supply path from said switching regulator transformer to said second semiconductor light-emitting element unit in order to regulate a current variation ratio between these paths; and a first switch operable to control whether the power is supplied to said first semiconductor light-emitting element unit, said first switch being provided at least on the first power supply path.

2. The vehicular lamp as claimed in claim 1, further comprising a control unit operable to supply an electric current smaller than that when said first switch is ON to a primary side of said switching regulator transformer when said first switch is OFF.

3. The vehicular lamp as claimed in claim 2, further comprising:

a third semiconductor light-emitting element unit that is connected to said first and said second semiconductor light-emitting element units in parallel; and a second secondary side transformer that magnetically couples a third power supply path from said switching regulator transformer to said third semiconductor light-emitting element unit and the second power supply path in order to regulate a current variation ratio between these paths.

4. The vehicular lamp as claimed in claim 3, further comprising a third secondary side transformer that magnetically couples the first power supply path and the third power supply path in order to regulate a current variation ratio between these paths.

5. The vehicular lamp as claimed in claim 4, further comprising a second switch that is provided on the second power supply path.

6. The vehicular lamp as claimed in claim 3, further comprising a third switch that is provided on the third power supply path.

7. The vehicular lamp as claimed in claim 5, further comprising a third switch that is provided on the third power supply path.

* * * * *